(12) United States Patent
Nagashima et al.

(10) Patent No.: US 6,369,319 B1
(45) Date of Patent: Apr. 9, 2002

(54) ELECTRICALLY ISOLATED COOLANT MANIFOLD WITH RECESSED APERTURES FOR EMI REDUCTION

(75) Inventors: James Nagashima, Cerritos; Terence G. Ward, Redondo Beach; Scott D. Downer, Torrance, all of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/552,019

(22) Filed: Apr. 19, 2000

(51) Int. Cl.⁷ ............................................. H02G 3/00
(52) U.S. Cl. ....................................... 174/50; 174/135
(58) Field of Search ........................... 174/65 R, 659, 174/151, 152 G, 153 G, 135; 248/56; 16/2.2

(56) References Cited

U.S. PATENT DOCUMENTS

| | | | | |
|---|---|---|---|---|
| 3,423,518 A | * | 1/1969 | Weagant | 174/153 |
| 3,836,269 A | * | 9/1974 | Koscik | 403/197 |
| 4,062,551 A | * | 12/1977 | Base | 277/102 |
| 5,057,971 A | * | 10/1991 | Hautvast et al. | 361/395 |
| 5,981,877 A | * | 11/1999 | Sakata et al. | 174/153 |
| 6,219,245 B1 | * | 4/2001 | Nagashima et al. | 174/35 R |

* cited by examiner

*Primary Examiner*—Dean A. Reichard
*Assistant Examiner*—Angel R. Estrada
(74) *Attorney, Agent, or Firm*—Anthony Luke Simon

(57) ABSTRACT

A power electronics chassis (10) for electric vehicles and other applications that use liquid coolant to cool power electronic devices (20) contained within the chassis. The chassis (10) includes an electrically conductive housing (12) and an electrically non-conductive manifold (16) that permits coolant flow into and out of the housing. The housing (12) has at least one wall (34) that includes an outer surface (42) and a pair of recessed apertures (36,72), each of which provide access to an interior region (38) of the housing (12) via a passageway (40,74). The manifold (16) has an inlet (26) and an outlet (28), each of which has a connecting tube (54,80) that extends through one of the passageways (40, 74). Each passageway (40,74) is defined by an axial wall (44,78) of the housing (12) that extends towards the interior region (38) from the outer surface (42) to its respective aperture. The apertures (36,72) are each formed by an annular wall (50,76) that extends radially inward from its associated axial wall (44,78) at the interior end of its passageway. The outer diameter of the connecting tubes (54,80) are equal to the diameter of their respective apertures (36,72). Thus, each tube (54,80) is in contact with its aperture (36,72) and is separated from its adjacent axial wall (44,78) by an annular gap (70). This configuration provides electrical isolation of the coolant from the chassis (10) in a manner that significantly reduces the radiated emissions at the apertures (36,72).

20 Claims, 1 Drawing Sheet

ELECTRICALLY ISOLATED COOLANT MANIFOLD WITH RECESSED APERTURES FOR EMI REDUCTION

TECHNICAL FIELD

The present invention relates generally to coolant manifolds and, in particular, to plastic coolant manifolds that are used in electric vehicles (both electric and hybrid electric vehicles) to supply coolant to and from a power electronics module within the vehicle.

BACKGROUND OF THE INVENTION

Electric vehicles typically utilize an inverter in the form of a switch-mode power supply to provide three phase operating power to the vehicle's electric drive motor. Because of the torque demands on the electric motor, the inverter includes a number of power switching devices that can supply the high currents needed. The inverter is usually located in an environmentally sealed module that is commonly referred to as the power electronics bay (PEB). This module typically includes other electronic circuits, such as those used to run the vehicle's electronic power steering, climate control compressor motor, and traction control system.

In an effort to minimize the amount of electromagnetic interference (EMI) radiated from the inverter and other circuitry within the power electronics bay, the circuits themselves are enclosed together within a grounded metal chassis. This chassis normally includes a housing having feedthrough electrical connectors (for power, control, and data signals) as well as an inlet and outlet coolant manifold that permit liquid coolant to be circulated through the power electronics bay for cooling of the inverter's power switching devices. In a typical liquid-cooled inverter application, the power switching devices are mounted by their baseplates to a conductive metallic liquid-interface heat exchanger. The coolant manifold of the heat exchanger that leads into and out of the chassis is metallic and is attached to the chassis. Thus, there is no electrical isolation at the interface between the switching devices and the heat exchanger, and at the interface between the heat exchanger and chassis. Consequently, the baseplates of the power switching devices are electrically connected to both the coolant and chassis, resulting in capacitive coupling between the power switching devices and the chassis that can be as much as 190 pF or more. This allows undesirably high currents to be injected into the chassis, resulting in unwanted radiated emissions.

Accordingly, there exists a need for a power electronics liquid coolant system that reduces the radiated EMI due to currents flowing from the switching devices through the coolant and into the chassis.

SUMMARY OF THE INVENTION

In accordance with the present invention, there is provided an improved enclosure for a liquid-cooled power electronics module of an electric vehicle. The enclosure comprises a power electronics chassis that includes a metal or otherwise electrically conductive housing and a plastic or otherwise electrically non-conductive manifold for providing coolant flow into the housing. The housing has at least one wall that includes an outer surface and a recessed aperture that provides access to an interior region of the housing via a passageway. The passageway is defined by an axial wall of the housing that extends towards the interior region from the outer surface of the housing to the aperture. The manifold has an inlet that extends through the passageway in contact with the housing. The inlet has an internal passage that is spaced from the axial wall by a first distance and that is spaced from the aperture by a second distance, with the first distance being greater than the second distance.

This configuration not only provides electrical isolation of the coolant from the chassis, but does so in a manner that significantly reduces the capacitive coupling between the coolant and chassis. As a result, when used for an electric vehicle power electronics module containing an inverter for the vehicle's electric drive motor, the invention significantly reduces the radiated EMI outside of the chassis, as compared to conventional chassis-manifold constructions.

Preferably, the aperture and passageway have a circular cross-sectional shape with the aperture being defined by an annular wall having a diameter that is less than the diameter of the passageway. Preferably, the outer surface and internal passage of the inlet have a circular cross-sectional shape and are uniform along their lengths, with the outer surface of the inlet only contacting the housing at the aperture. This provides a gap between the inlet and inner wall of the passageway that helps reduce capacitive coupling between the coolant and chassis.

BRIEF DESCRIPTION OF THE DRAWINGS

A preferred exemplary embodiment of the present invention will hereinafter be described in conjunction with the appended drawings, wherein like numerals denote like elements, and wherein.

DESCRIPTION OF THE PREFERRED EMBODIMENT

Figure 1:
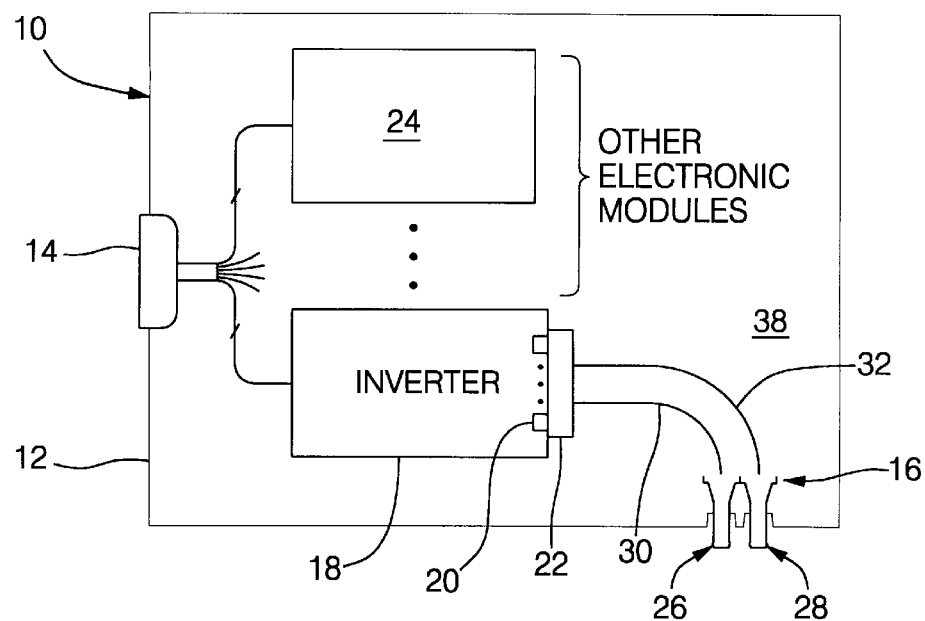
FIG. 1 is a diagrammatic view of an electric vehicle power electronics chassis of the present invention showing various electronic modules contained therein.

Referring first to FIG. 1, there shown a power electronics chassis or enclosure 10 constructed in accordance with the present invention. The chassis 10 includes a metal housing 12 having at least one electrical connector 14 for feedthrough of power, control, and data wires and a plastic coolant manifold 16 for feedthrough of liquid coolant. Contained within housing 12 is an inverter 18 in the form of a switch mode power supply having a number of semiconductor power switching devices 20 that are thermally coupled to a heat exchanger 22. Also contained within housing 12 are a number of other electronic modules 24 that are electrically connected along with inverter 18 to the connector 14.

Coolant manifold 16 includes both an inlet 26 and an outlet 28, each of which has a respective conduit 30, 32 that are used to circulate liquid coolant from inlet 26 into the heat exchanger 22 and back out of the housing 12 via outlet 28. This permits use of the coolant to remove heat from the power switching devices 20 while simultaneously reducing EMI radiated emissions outside of chassis 10. As will be appreciated, power devices utilized in one or more of the other electronic modules 24 can be thermally coupled to heat exchanger 22 to provide suitable heat sinking. Alternatively, the coolant fed into and out of housing 12 via manifold 16 can be passed serially (or in parallel) through other heat exchangers (not shown) to provide heat sinking of power devices in one or more of the other electronic modules 24.

Figure 2:
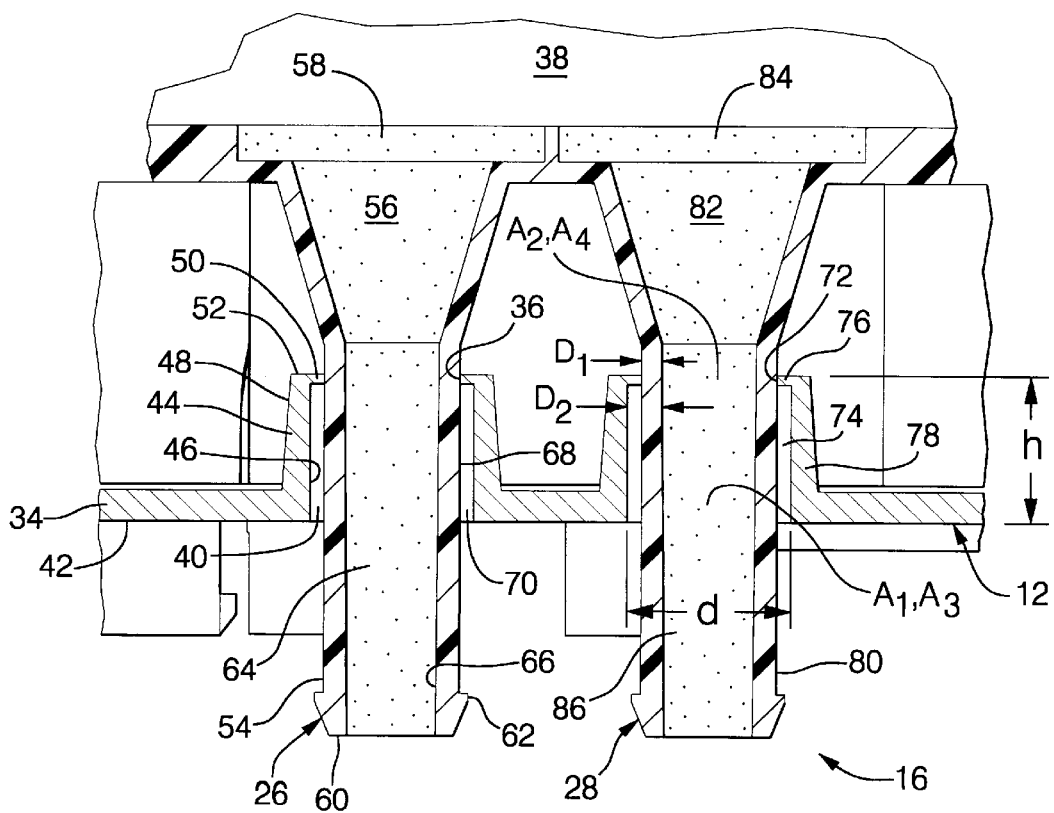
FIG. 2 is a fragmentary, cross-sectional view of the chassis of FIG. 1.

Referring now to FIG. 2, there is shown a fragmentary, cross-sectional view of manifold 16 and a portion of housing 12 where inlet 26 and outlet 28 feed through the housing wall 34. As shown, inlet 26 enters housing 12 through a recessed aperture 36 that provides access to an interior region 38 of the housing via a passageway 40. This passageway extends from an outer surface 42 of housing wall 34 to aperture 36 and is defined by an axial wall 44 that extends towards the interior region 38 from outer surface 42 to the aperture 36. More specifically, in the illustrated embodiment, the axial wall 44 has an inner surface 46 having a circular cross-sectional shape of uniform diameter along its length, such that passageway 40 has an overall cylindrical shape. Axial wall 44 has an outer surface 48 that has a circular cross-sectional shape of decreasing diameter in the interior direction. This gives axial wall 44 an annular cross-sectional shape with a fixed inside diameter and a wall thickness that tapers downwardly from a larger value at the outer surface 42 of housing 12 to a smaller value at aperture 36.

Recessed aperture 36 is defined by an annular wall 50 located at the interior end 52 of axial wall 44. Annular wall 50 extends radially inward from axial wall 44 such that it separates passageway 40 from the interior region 38 of housing 12. Thus, as will be appreciated, aperture 36 is not only recessed from the outer surface 42 of housing 12, but also has a diameter that is less than the diameter of passageway 40. Preferably, housing wall 34, axial wall 44, and annular wall 50 all comprise unitary portions of a single cast housing 12.

Inlet 26 comprises a connecting tube 54 that feeds the coolant into an expansion chamber 56 which opens into a port 58 to which the conduit 30 (shown in FIG. 1) can be connected. Preferably, tube 54, chamber 56, and port 58 all comprise unitary portions of coolant manifold 16. The connecting tube 54 extends outwardly from the interior region 38 through aperture 36 and passageway 40 and extends beyond the outer surface 42 of housing 14 by a distance sufficient to permit attachment of a coolant hose (not shown) over the exterior end 60 of tube 54. Connecting tube 54 is an elongated tube that includes a flange 62 at its exterior end 60 which can be used with a hose clamp (not shown) in a conventional manner to retain the coolant hose in place and maintain a sealed connection between the coolant hose and tube 54.

Connecting tube 54 has an internal passage 64 that is defined by an inner surface 66 of tube 54. The inner surface 66 has a circular cross-sectional shape that is uniform along its length. Tube 54 also has an outer surface 68 having a circular cross-sectional shape that is uniform along its length, except at flange 62. The outer surface 68 of tube 54 has a diameter that is equal to the diameter of recessed aperture 36. As a result, the annular wall 50 contacts tube 54 and acts to locate inlet 26 such that its connecting tube 54 is coaxially aligned with axial wall 44. Because of the larger diameter of passageway 40, this construction results in an annular gap 70 between the outer surface 68 of tube 54 and the inner surface 46 of axial wall 44.

As shown in the illustrated embodiment, housing 12 also includes a second recessed aperture 72 and second passageway 74 that accommodate the outlet 28 of coolant manifold 16. Aperture 72 and passageway 74 are formed by an annular wall 76 and axial wall 78 that are identical to annular wall 50 and axial wall 44, respectively. Recessed aperture 72 therefore has the same dimensions as aperture 36, and passageway 74 has the same dimensions as passageway 40. Outlet 28 includes a connecting tube 80, expansion chamber 82, and port 84, each of which have the same dimensions as their corresponding parts on inlet 26. Preferably, inlet 26 and outlet 28 comprise unitary portions of manifold 16, as shown. As will be appreciated, manifold 16 can be formed as an injection molded component from high impact ABS or other suitable plastics known to those skilled in the art.

As will now be discussed, the use of the recessed apertures 36, 72 and enlarged passageways 40, 74 along with the plastic inlet 26 and outlet 28 provide increased isolation of the coolant from housing 12, thereby attenuating the radiated emissions. Although the following discussion is provided in connection with the outlet 28 and its associated aperture 72, it will be appreciated that the analysis applies equally to radiated emissions at aperture 36.

As can be seen by inspection of FIG. 2, coolant traveling through connecting tube 80 is spaced from the electrically conductive annular wall 76 by the wall thickness of tube 80. However, the coolant is spaced from axial wall 78 by an amount equal to the wall thickness of tube 80 plus the width of the gap between axial wall 78 and tube 80. That is, the inner surface of connecting tube 80 is spaced from aperture 72 by a distance $D_1$, whereas that same inner surface is spaced from the axial wall 78 by a larger distance $D_2$ along the length of passageway 74. This helps reduce the capacitive coupling between the coolant and chassis, thereby helping to minimize the injected current into the chassis due to the high energy switching of the power switching devices 20.

It will also be apparent by inspection of FIG. 2 that the cross-sectional area $A_1$ of axial wall 78 at the outer surface 42 of housing 12 is greater than the cross-sectional area $A_2$ of aperture 72. Since the cross-sectional area $A_3$ of the internal passage 86 within tube 80 at the outer surface 42 of housing 12 is equal to the cross-sectional area $A_4$ of that same passage at aperture 72, it will be appreciated by those skilled in the art that reduced radiated emissions can be obtained by constructing housing 12 and outlet 28 such that the ratio of the cross-sectional area $A_1$ to the cross-sectional area $A_3$ is greater than the ratio of the cross-sectional area $A_2$ to the cross-sectional area $A_4$.

The reduction in radiated emissions does not result simply from the use of the plastic manifold 16, but is also a result of the recessed aperture 72 and spacing of the axial wall 78 from the coolant within the connecting tube 80. Quantitatively, it has been determined that, using standard mounting techniques for the power switching devices 20 and heat exchanger 22, the present invention can achieve a capacitance of less than 1 pF between the power switching devices 20 and chassis 10. This results in a theoretical improvement of 12–20 dB in injected current amplitude when compared to prior art designs that can have as much as 190 pF of capacitance between the power devices and chassis. For the illustrated embodiment, the tubular openings at the apertures have a cut-off frequency $f_c$ in Hertz of:

$$f_c = 1.7063 \times d \times \sqrt{e_r} \qquad (1)$$

where d is equal to the diameter of the passageway in inches and $e_r$ is the dielectric constant of the medium between the axial wall 78 and internal passage 86. For signals propagating from the interior region of the housing through the apertures that have a frequency below $f_c$, the signal attenuation S in decibels is:

$$S = 32 \times h/d, \qquad (2)$$

where h is the amount of distance in inches that the aperture is recessed from the outer surface of the housing. Preferably, housing 12 aid outlet 28 are constructed such that the cut-off frequency $f_c$ is at least an order of magnitude above the operating frequency of the power switching devices so that the radiated emissions from the apertures will be significantly attenuated.

Although the primary known advantage of the present invention is the reduction of radiated emissions from the chassis, other advantages can be realized as well. For example, the electrical isolation of the coolant from the chassis housing results in lower galvanic activity that could otherwise result in scaling and eventual system failure.

It will thus be apparent that there has been provided in accordance with the present invention a power electronics chassis which achieves the aims and advantages specified herein. It will, of course, be understood that the foregoing description is of a preferred exemplary embodiment of the invention and that the invention is not limited to the specific embodiment shown. Various changes and modifications will become apparent to those skilled in the art and all such changes and modifications are intended to be within the scope of the present invention.

We claim:

1. A liquid-cooled power electronics chassis for an electric vehicle, comprising:
    an electrically conductive housing having at least one wall that includes an outer surface and a recessed aperture that provides access to an interior region of said housing via a passageway, said passageway being defied by an axial wall that extends towards said interior region from said outer surface to said aperture; and
    an electrically non-conductive coolant manifold having an inlet extending through said passageway in contact with said housing, said inlet having an internal passage that is spaced from said aperture by a first distance and that is spaced from said axial wall by a second distance, wherein said first distance is less than said second distance.

2. A power electronics chassis as defined in claim 1, wherein said aperture is defined by an annular wall that extends radially inward and that separates said interior region of said housing from said passageway.

3. A power electronics chassis as defined in claim 2, wherein said annular wall is unitary with said axial wall.

4. A power electronics chassis as defined in claim 1, wherein said axial wall has an inner surface having a circular cross-sectional shape.

5. A power electronics chassis as defined in claim 1, wherein said inlet has an outer surface that is in contact with said housing at said aperture and that is spaced from said axial wall by a gap.

6. A power electronics chassis as defined in claim 1, wherein said internal passage of said inlet has a circular cross-sectional shape that is uniform along its length.

7. A power electronics chassis as defined in claim 1, wherein said recessed aperture and passageway comprise a first recessed aperture and a first passageway, respectively, and wherein said housing further comprises a second recessed aperture and second passageway and, further, wherein said manifold comprises an outlet extending through said second aperture and second passageway.

8. A power electronics chassis as defined in claim 7, wherein said second aperture and said second passageway have the same dimensions as said first recessed aperture and said first passageway, respectively, and wherein said outlet has the same dimensions as said inlet.

9. A power electronics chassis for an electric vehicle, comprising:
    an electrically conductive housing having at least one wall that includes an outer surface and an aperture that is recessed from said outer surface and that provides access to an interior region of said housing via a passageway, said passageway being defined by an axial wall that extends towards said interior region from said outer surface to said aperture, said axial wall having a first cross-sectional area at said outer surface and said aperture having a second cross-sectional area; and
    an electrically non-conductive inlet extending through said aperture and passageway in contact with said housing at said aperture, said inlet having an internal passage with said passage having a third cross-sectional area at said outer surface of said housing and having a fourth cross-sectional area at said aperture, wherein the ratio of said first cross-sectional area to said third cross-sectional area is greater than the ratio of said second cross-sectional area to said fourth cross-sectional area.

10. A power electronics chassis as defined in claim 9, wherein said aperture is defined by an annular wall that extends radially inward and that separates said interior region of said housing from said passageway.

11. A power electronics chassis as defined in claim 10, wherein said annular wall is unitary with said axial wall.

12. A power electronics chassis as defined in claim 9, wherein said passageway and said aperture each have a circular cross-sectional shape, with said first cross-sectional area being greater than said second cross-sectional area.

13. A power electronics chassis as defined in claim 9, wherein said inlet has an outer surface that is in contact with said housing at said aperture and that is spaced from said axial wall by a gap.

14. A power electronics chassis as defined in claim 9, wherein said inlet has an inner surface having a circular cross-sectional shape that provides said passage with a uniform cross-sectional shape along its length, whereby said third and fourth cross-sectional areas are equal.

15. A power electronics chassis as defined in claim 9, wherein said recessed aperture and passageway comprise a first recessed aperture and a first passageway, respectively, and wherein said housing further comprises a second recessed aperture and second passageway and, further, wherein said chassis further comprises an outlet extending through said second aperture and second passageway.

16. A power electronics chassis as defined in claim 15, wherein said second aperture and said second passageway have the same dimensions as said first recessed aperture and said first passageway, respectively, and wherein said outlet has the same dimensions as said inlet.

17. A power electronics chassis for an electric vehicle, comprising:
    an electrically conductive housing having at least one wall that includes an outer surface and a recessed aperture that provides access to an interior region of said housing via a passageway, said passageway being defined by an axial wall that extends towards said interior region from said outer surface to said aperture, wherein said axial wall has an inner surface having a circular cross-sectional shape and has a wall thickness that tapers downwardly from a larger value at said outer surface to a smaller value at said aperture; and
    an electrically non-conductive manifold having an inlet extending through said passageway in contact with said housing, said inlet having an internal passage that is spaced from said aperture by a first distance and that is spaced from said axial wall by a second distance, wherein said first distance is less than said second distance.

18. A power electronics chassis for an electric vehicle, comprising:

an electrically conductive housing having at least one wall that includes an outer surface and a recessed aperture that provides access to an interior region of said housing via a passageway, said passageway being defined by an axial wall that extends towards said interior region from said outer surface to said aperture; and an electrically non-conductive manifold having an inlet extending through said passageway in contact with said housing, said inlet having an internal passage that is spaced from said aperture by a first distance and that is spaced from said axial wall by a second distance, wherein said first distance is less than said second distance;

wherein said recessed aperture and passageway comprise a first recessed aperture and a first passageway, respectively, and wherein said housing further comprises a second recessed aperture and second passageway and, further, wherein said manifold comprises an outlet extending through said second aperture and second passageway;

wherein said second aperture and said second passageway have the same dimensions as said first recessed aperture and said first passageway, respectively, and wherein said outlet has the same dimensions as said inlet; and wherein said aperture is recessed from said outer surface by a distance h and wherein signals propagating from said interior region through said aperture that have a frequency below a cut-off frequency $f_c$ are attenuated according to the equation:

$$S = 32 * h/d$$

where: S is the signal attenuation in decibels, h is the distance measured in inches, d is equal to the diameter of said passageway in inches, and $f_c$ is determined according to the equation:

$$f_c = 1.7063 * d * \sqrt{e_r}$$

where $e_r$ is the dielectric constant between said axial wall and said internal passage.

19. A power electronics chassis for an electric vehicle, comprising:

an electrically conductive housing having at least one wall that includes an outer surface and a recessed aperture that provides access to an interior region of said housing via a passageway, said passageway being defined by an axial wall that extends towards said interior region from said outer surface to said aperture, said axial wall having a first cross-sectional area at said outer surface and said aperture having a second cross-sectional area; and an electrically non-conductive inlet extending through said aperture and passageway in contact with said housing at said aperture, said inlet having an internal passage with said passage having a third cross-sectional area at said outer surface of said housing and having a fourth cross-sectional area at said aperture, wherein the ratio of said first cross-sectional area to said third cross-sectional area is greater than the ratio of said second cross-sectional area to said fourth cross-sectional area;

wherein said recessed aperture and passageway comprise a first recessed aperture and a first passageway, respectively, and wherein said housing further comprises a second recessed aperture and second passageway and, further, wherein said chassis further comprises an outlet extending through said second aperture and second passageway;

wherein said second aperture and said second passageway have the same dimensions as said first recessed aperture and said first passageway, respectively, and wherein said outlet has the same dimensions as said inlet; and wherein said aperture is recessed from said outer surface by a distance h and wherein signals propagating from said interior region through said aperture that have a frequency below a cut-off frequency $f_c$ are attenuated according to the equation:

$$S = 32 * h/d$$

where: S is the signal attenuation in decibels, h is the distance measured in inches, d is equal to the diameter of said passageway in inches, and $f_c$ is determined according to the equation:

$$f_c = 1.7063 * d * \sqrt{e_r}$$

where $e_r$ is the dielectric constant between said axial wall and said internal passage.

20. A power electronics chassis for an electric vehicle, comprising:

an electrically conductive housing having at least one wall that includes an outer surface and a recessed aperture that provides access to an interior region of said housing via a passageway, said passageway being defined by an axial wall that extends towards said interior region from said outer surface to said aperture, said axial wall having a first cross-sectional area at said outer surface and said aperture having a second cross-sectional area; and an electrically non-conductive inlet extending through said aperture and passageway in contact with said housing at said aperture, said inlet having an internal passage with said passage having a third cross-sectional area at said outer surface of said housing and having a fourth cross-sectional area at said aperture, wherein the ratio of said first cross-sectional area to said third cross-sectional area is greater than the ratio of said second cross-sectional area to said fourth cross-sectional area;

wherein said recessed aperture and passageway comprise a first recessed aperture and a first passageway, respectively, and wherein said housing further comprises a second recessed aperture and second passageway and, further, wherein said chassis further comprises an outlet extending through said second aperture and second passageway; and wherein said inlet and outlet together comprise a unitary plastic coolant manifold.

* * * * *